United States Patent
Peck

(10) Patent No.: US 6,775,588 B1
(45) Date of Patent: Aug. 10, 2004

(54) DISTRIBUTED INTELLIGENCE, WIRELESS, LIGHT-DIRECTED PICK/PUT SYSTEM

(75) Inventor: John C. Peck, Seneca, SC (US)

(73) Assignee: Foxfire Technologies, Inc., Six Mile, SC (US)

( * ) Notice: Subject to any disclaimer, the term of this patent is extended or adjusted under 35 U.S.C. 154(b) by 0 days.

(21) Appl. No.: 10/617,157

(22) Filed: Jul. 10, 2003

Related U.S. Application Data

(60) Provisional application No. 60/443,584, filed on Jan. 30, 2003.

(51) Int. Cl.[7] .................................................. G06F 7/00
(52) U.S. Cl. ......................... 700/214; 700/215; 700/216
(58) Field of Search ................................. 700/214, 213, 700/215, 216, 241, 242; 235/385; 705/22, 28, 29

(56) References Cited

U.S. PATENT DOCUMENTS

| | | | |
|---|---|---|---|
| 3,739,339 A | | 6/1973 | Hillhouse |
| 4,821,197 A | * | 4/1989 | Kenik et al. ................. 700/106 |
| 5,113,349 A | * | 5/1992 | Nakamura et al. ........... 700/215 |
| 5,505,473 A | | 4/1996 | Radcliffe |
| 5,812,986 A | * | 9/1998 | Danelski ....................... 705/22 |
| 5,877,698 A | | 3/1999 | Kusnier |
| 5,877,962 A | | 3/1999 | Radcliffe |
| 6,124,800 A | | 9/2000 | Beard |
| 6,650,225 B2 | * | 11/2003 | Bastian et al. .............. 340/5.92 |
| 6,711,458 B1 | * | 3/2004 | Kofoed ........................ 700/213 |

* cited by examiner

Primary Examiner—Khoi H. Tran
(74) Attorney, Agent, or Firm—Stephen R. Chapman; Leigh P. Gregory

(57) ABSTRACT

A system by which a portable computer on a cart translates warehouse locations to light addresses of locations on storage bays in a storage facility and communicates instructions by means of a bi-directional, dual transmitter/receiver element on the cart to a pick-controller unit positioned on each bay. The pick-controller unit on the bay is connected with intelligent light assemblies at each location on the bay that, in response to instructions from the portable computer, illuminate indicating the need for, and quantity of a SKU to be retrieved from the illuminated location. In addition, the portable computer communicates instructions using the bi-directional, dual transmitter/receiver element to the put-controller unit positioned on the cart that in turn communicates these instructions to intelligent light assemblies adjacent to specific receptacles located on the cart. The intelligent light assemblies adjacent to the receptacles illuminate in response to instructions from the portable computer, indicating the quantity of the retrieved SKU(s) to be deposited into each of one or more receptacles, thereby facilitating batch picking of multiple orders by an attendant operating the cart.

17 Claims, 4 Drawing Sheets

DISTRIBUTED INTELLIGENCE, WIRELESS, LIGHT-DIRECTED PICK/PUT SYSTEM

RELATED APPLICATIONS

This application claims the benefit of U.S. Provisional Application No. 60/443,584 filed Jan. 30, 2003 and which is incorporated herein by reference.

FIELD OF THE INVENTION

The invention is directed to a distributed system of intelligent automata: it is in part a light-directed, coupled system to facilitate the retrieval of stock keeping units (SKUs) stored in uniquely identified locations and subsequent placement of these same items into uniquely identified receptacles. More specifically it comprises a system whereby unique location addresses are translated to specific light addresses in a storage facility. Even more specifically, it is a system whereby a single light or lighted character display which is an integral part of an intelligent light assembly is activated at the exact storage location of a specific SKU in response to communication by wired means from a portable computer through a bi-directional, dual transmitter/receiver element then by wireless means to a pick-controller unit that is wired to a plurality of intelligent light assemblies. Each intelligent light assembly represents a unique light address and is positioned at a corresponding unique physical location or address in the storage facility. Still more specifically, it is a system wherein intelligent light assemblies associated with specific storage receptacles are also activated by instructions received from the portable computer through a bi-directional, dual transmitter/receiver element to a put-controller unit thereby indicating the locations (receptacles) and quantity of retrieved items to be placed in the designated receptacles, thereby facilitating batch picking of multiple orders. And yet more specifically, it is a system wherein the portable computer, bi-directional, dual transmitter/receiver element, put-controller unit, and the storage receptacles with associated intelligent light assemblies are all positioned on a mobile retrieval element capable of being propelled throughout the storage facility. A pick-controller unit and intelligent light assemblies and related hardware are stationary units, with each individual light assembly mounted and wired on an individual location in a storage bay.

The invention anticipates a plurality of mobile retrieval units and of storage bays.

BACKGROUND OF THE INVENTION

Filling orders from stored inventory requires at least three steps: locating the precise item in the storage facility, retrieving (or picking) the desired quantity of that item, and storing (or putting) the retrieved items in a designated container or receptacle. The basic steps may apply to a variety of situations in which items must be identified, selected, and distributed or placed in a second location. Frequently this process is generally described in terms of order fulfillment in a warehouse.

Storage in a facility may be viewed as a nested or hierarchical arrangement with bays arranged along aisles and shelves or storage containers located in or on a bay. Thus, the location of a specific item, commonly referred to as a Stock Keeping Unit or SKU, would be an "address" in the storage facility comprising the aisle, the bay along that aisle, and a shelf, bin or container located in the bay. So long as a protocol exists to associate only one SKU with each unique combination of aisle, bay, and shelf, identification of a particular SKU is unnecessary to identify or characterize the item to be picked, since the address of the item is sufficient.

In an exclusively manual system, an employee receives an order for a specific item or group of items. Either by memory, which is subject to error, or by reference to a facility map or plan, the employee must identify the location of the item, go to that location, pick the required quantity of items for the order, and either return to a central shipping point or place them in an appropriate receptacle. This process is repeated until a given order is filled. Multiple opportunities for errors exist, from misreading the storage facility location label, to selecting from an incorrect, but adjacent shelf or other storage receptacle, to picking the wrong quantity of the correct item, or to putting the correct items in an incorrect receptacle for subsequent shipping or order processing. In addition, many separate orders may require the same item, but in an exclusively manual system, batch order picking is most commonly the exception, rather than the rule, resulting in significant inefficiencies associated with repeated trips to pick each order individually.

Technology has advanced beyond the exclusively manual system of pick and put. The evolution of computer technology and related electronic systems has played a significant part in this advancement. U.S. Pat. No. 3,739,339 issued to Hillhouse on Jun. 12, 1973 describes a system that is characteristic of the status of current pick and put technology for many warehouse-like situations.

In the '339 patent, a computer punch-card system is used in which the row by column punch matrix of the card represents the storage location of items, and quantities of the item to be picked may also be encoded. At least one card reader is wired to a computer. When a card is inserted into a card reader positioned on a bay or similar group of discrete storage units, the configuration of punches activates a light system such that the precise location of the item is indicated by an illuminated element, and the quantity to be selected is displayed in a centrally located, lighted display. The system also provides for a put-to-light process with a separate light system wired to individual containers or receptacles. Major deficiencies of this system include the requirement of hard wire communications of the light systems, communications through the card reader to a central computer, and the fact that overall efficiency and performance of the system degrades as the number of lights increases. The system has virtually no fault tolerance: failure of any central component causes the entire system to fail.

Radio communications have been applied to inventory related, selection applications. U.S. Pat. No. 5,877,698 issued to Kusiner, et al. on Mar. 2, 1999 describes a system of radio transmitters positioned throughout a supermarket with mobile receivers positioned on shopping carts commonly used by customers. When a receiver is within a limited range of any specific transmitter, an exclusive link is established whereby the transmitter sends to the receiver a specific advertising message calling attention to a "bargain" product at a specific nearby location. The link is broken as the receiver moves out of range of the local transmitter, but may establish links with other transmitters throughout the facility.

U.S. Pat. No. 6,124,800 issued to Beard and Bunte on Sep. 26, 2000 discloses and claims a route delivery system utilizing both local area network and wide area network radio frequencies to communicate inventory data between an end delivery point (such as a vending machine) and a stocked delivery vehicle, and between the vehicle and a base office to minimize the number of actual visits a service person must make to deliver the necessary inventory items to a specific end point as well as to simplify routing of the delivery vehicle.

U.S. patent No. 5,505,473 issued to Radcliffe on Apr. 9, 1996 and U.S. Pat. No. 5,877,962, a divisionally related patent issued to Radcliffe on Mar. 2, 1999 describe and claim respectively a computer-based system to facilitate proper placement of articles picked by an attendant from inventory storage shelves and deposited in delivery containers mounted on a cart and a method for the practical utilization of the system. In addition, the system and related method include an optional beacon light system to indicate the location of inventory items to be picked or recovered.

The system of the '473 patent and related method of the '962 patent depend on a single intelligent element or computer that must maintain constant two-way radio communication between a receiver/central control unit mounted on a cart and between the optional beacon system located on storage shelves. A scanner mounted on the cart is used to read codes on either the location or item to be picked to validate the designated pick.

Current technology includes warehouse management systems wherein given a request for any specific item, the system responds by identifying the specific storage location in the facility.

There remains opportunity and need for the development of intelligent automata in which dependency on a single intelligent unit (computer) is minimized and in which novel, intelligent technologies and systems are combined to yield a more reliable and efficient, distributed, generalized, light-directed picking/putting system as will be fully described in the following specification, including figures and the appended claims.

SUMMARY OF THE INVENTION

Accordingly, a goal of this invention is a light directed picking/putting system utilizing distributed intelligence to facilitate processing the picking of customer orders such that the quantity of an item and its specific storage location in a warehouse are visually displayed to an attendant who retrieves (picks) the specific quantity of the indicated items and places (puts) them into one or more designated receptacles for further delivery processing.

A further goal of this invention is a system wherein a portable computer translates pick order information to light addresses and through a series of circuits activates lighted character displays indicating the quantity of items and location from which the items are to be retrieved.

A still further goal of this invention is an intelligent light assembly capable of receiving light address and pick order directions and illuminating a character display indicating the storage location and quantity of items to be retrieved therefrom.

An additional goal of the invention is to utilize independent portable computers positioned on mobile elements to each communicate via wireless means with an intelligent pick-controller unit positioned on storage bays to activate visual signals indicating the location of an item on a shelf in the bay.

A further goal of the invention is a system of distributed intelligence that reduces the need for repeated visits to the same storage bay to pick multiple SKUs by directing the attendant to pick specific quantities of these SKUs from locations designated with lighted character displays and by directing the attendant to put these items into a single receptacle identified by a lighted character display.

Still another goal of the invention is a system of distributed intelligence that reduces the need for repeated visits to the same storage location for an item required in multiple, independent orders by directing the attendant to pick an aggregate order quantity from a single storage location, identified by the aggregate order quantity shown in a lighted character display, and to put designated quantities of this SKU into multiple receptacles, each identified by the designated quantity shown in a lighted character display, thereby facilitating batch putting of multiple, independent orders.

And still a further goal of the invention is management through an interactive system associated with the light-directed pick/put system that allows the attendant to indicate that the pick is successfully completed or not.

Yet an additional goal is a system that indicates unidentified locations to be assigned a light address that is unique only to that specific location and independent of any central computer system.

Another goal is to provide a system with keyboard or speech-recognized completion confirmation that tolerates faults in any put- or pick-controller unit or intelligent light assembly by directing an attendant through spoken or visual means, independent of such controller units and intelligent light assemblies, to pick and put items according to an order.

These and other goals are achieved by a communication system having a bi-directional, dual transmitter/receiver element in wired communication with a portable computer and in wired or wireless communication with put- and pick-controller units in which the portable computer translates order location data into light addresses that are communicated by wireless means to a pick-controller unit positioned on a storage bay and in electrical communication with a plurality of intelligent light assemblies each of which intelligent light assemblies is positioned at a unique location such that in response to the communicated, translated, order location data, a specific intelligent light assembly is activated illuminating a character display thereby indicating the location and quantity of the SKU to be retrieved from that location, and further, the portable computer, the bi-directional, dual transmitter/receiver element, and put-controller unit are positioned on a mobile element that has a plurality of receptacles positioned on it, each receptacle having a unique, intelligent light assembly positioned near it and wired to the put-controller unit such that in response to translated location data communicated from the portable computer through the bi-directional, dual transmitter/receiver element and then through the put-controller unit a character display is activated indicating the quantities of any retrieved SKU to be put into each of one or more indicated receptacles.

Moreover, these and other goals are achieved by a method that includes positioning, on a mobile element, a portable computer that has been programmed to translate pick order locations to specific pick-location light addresses and to specific put-location light addresses associated with specific receptacles that are positioned on the same mobile element on which the portable computer is positioned, and entering pick orders into the portable computer after which the mobile unit attendant is instructed to traverse a predetermined path throughout the storage facility, and in response to a communication system activated by the attendant, intelligent light assemblies at specified storage locations illuminate to indicate the location and quantity of an item to be picked from that location, and similar intelligent light assemblies on the mobile unit indicate the quantity of each picked item to be put into designated receptacles located on the mobile element; the attendant repeats the intelligent light assembly directed pick and put process until one or more orders is filled, returns the mobile unit to a drop-off station for unloading and is then ready to repeat the entire process when additional orders are entered into the portable computer.

These and other goals of the invention are still further achieved by a distributed intelligence communication system with a pick-controller unit capable of being engaged in two-way communication by means of a bi-directional, dual transmitter/receiver element with a computer and being engaged in two-way communication with a plurality of first intelligent light assemblies, and also having a put-controller unit in two-way communication by means of a bi-directional, dual transmitter/receiver element with a computer and being engaged in two-way communication with a plurality of second intelligent light assemblies, and still further having means that enable a first intelligent light assembly to respond to coded messages transmitted through the pick-controller unit by the computer thereby displaying unique instructions, and still further having means that enable a second intelligent light assembly to respond to coded messages transmitted through the put-controller unit by the computer thereby displaying unique instructions, and finally having means that enable activation of a second intelligent light assembly in coordination with activation of a first intelligent light assembly.

BRIEF DESCRIPTION OF THE FIGURES

The numerous purposes, applications, and advantages of the present invention may be better understood by those skilled in the art by reference to the following figures in which each reference number, regardless of the figure in which it is used, refers to the same part with the number as it initially is used and in which.

DETAILED DESCRIPTIONS OF THE PREFERRED EMBODIMENTS

Figure 1:
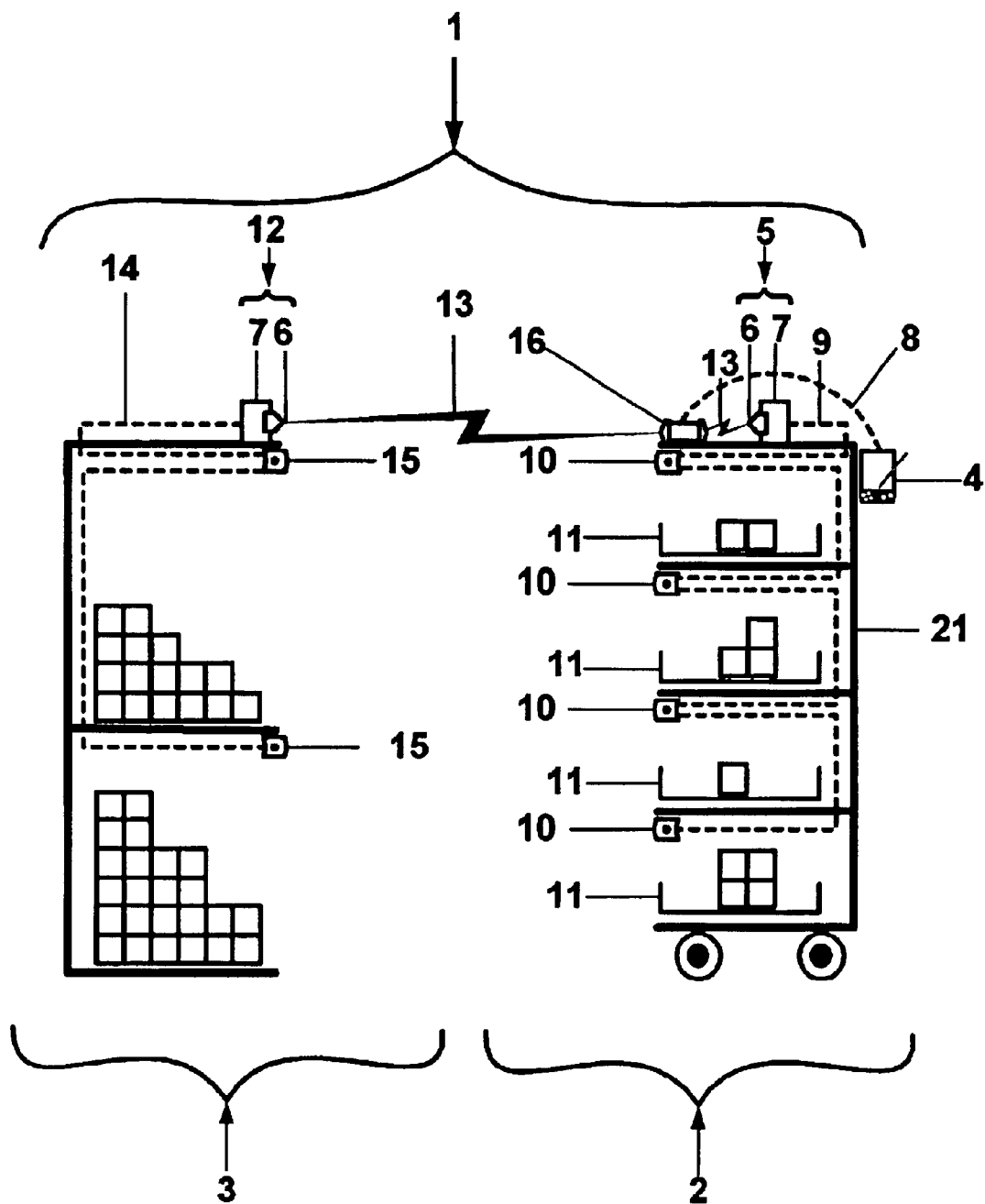
FIG. 1 is a schematic, block diagram of the entire wireless, light-directed, pick/put system with a single mobile unit, a single stationary unit, and lines of communication and their inter-relationships.

FIG. 1 presents the major elements and basic organization of the unique, distributed, wireless, light-directed, pick/put system 1. The system 1 comprises at least one mobile unit 2 and at least one stationary unit 3.

Each mobile unit 2 comprises a mobile element 21 on which are positioned a portable computer 4 and a put-controller unit 5. The put-controller unit comprises two integrated elements, a transmitter/receiver component 6 and intelligent circuitry element 7. Preferably, the portable computer 4 is in wired, bi-directional communication 8 with a bi-directional, dual transmitter/receiver element 16 that in turn is in wireless, bi-directional communication 13 with both the put-controller unit 5 and the pick-controller unit 12. The put-controller unit 5 is wired directly 9 for bi-directional communication, preferably using an RS-485 port, to a plurality of intelligent light assemblies 10. The intelligent light assemblies are positioned on or convenient to individual, removable receptacles 11 that are positioned on and transported by the mobile element 21.

In an alternative mode, the portable computer 4 uses the bi-directional, dual transmitter/receiver element 16 in a mode disconnected from the mobile unit 2 to communicate bi-directionally with put-controller unit 5 and pick-controller unit 12 and consequently controls the operation of intelligent light assemblies 10 and 15 by wireless means while walking from place to place.

The portable computer 4 also may include an integrated bar code reader used in associating light addresses with storage locations. The bar code reader may be independent of, but capable of communicating with the portable computer.

The stationary unit 3 as described in FIG. 1 comprises a pick-controller unit 12. The pick-controller unit 12 comprises a bi-directional, dual transmitter/receiver component 6 and an intelligent circuitry element 7. The put-controller unit 5 and pick-controller unit 12 are capable of being in bi-directional, wireless communication 13 with each other. The pick-controller unit 12 is in bi-directional, wired communication 14 with a plurality of intelligent light assemblies 15, each of which contains a unique light address and is positioned at a specific location on a storage bay with multiple locations.

Figure 2A:
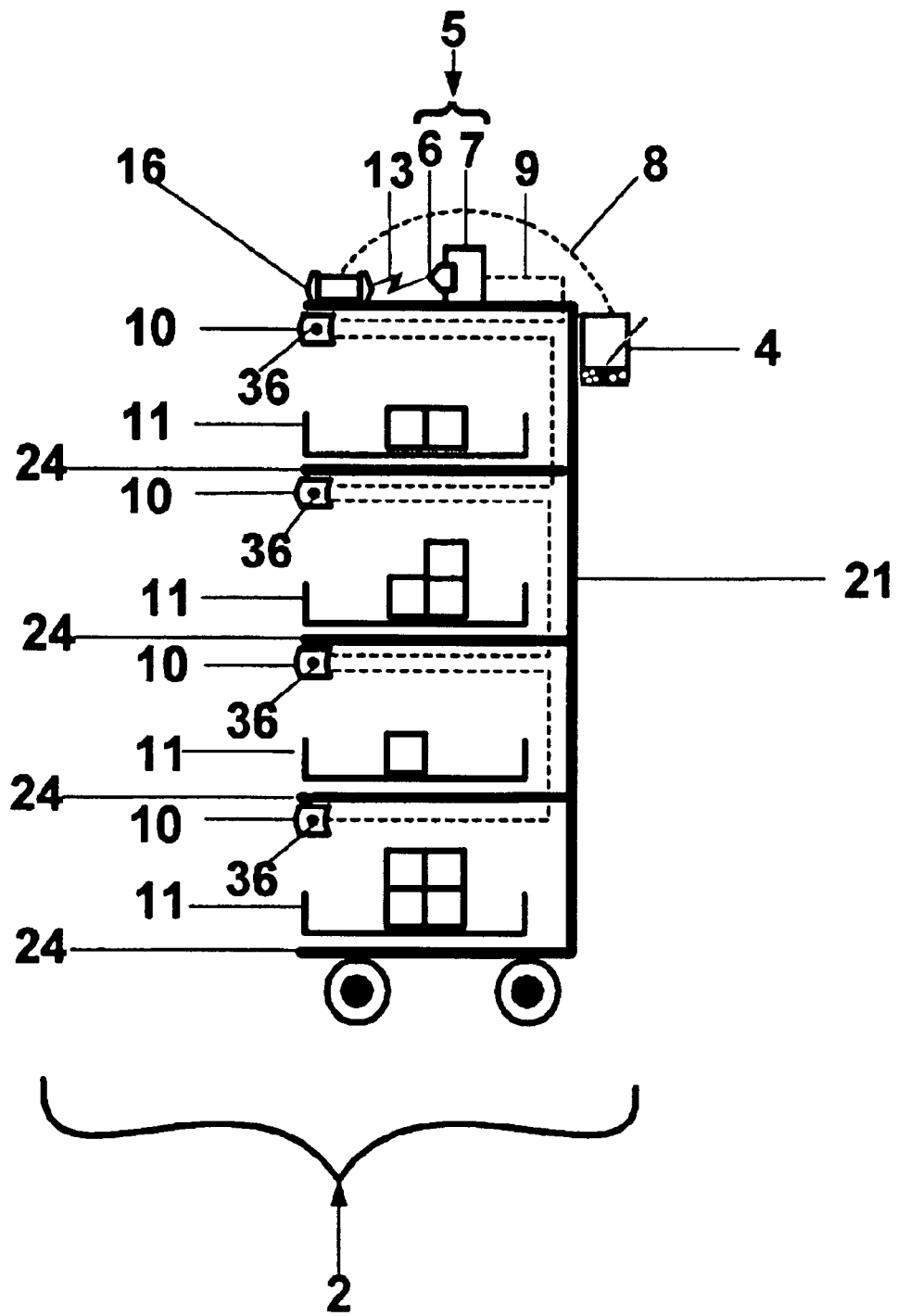
FIG. 2A is a detailed schematic diagram of a mobile unit in accordance with the present invention.

FIG. 2A provides details of the mobile unit 2. A mobile element 21 provides the structural frame for the mobile unit 2. In practice, the mobile element 21 may be any of a variety of custom or commercially available carts appropriate to move in a specific facility. Most commonly, the cart is moved by hand; however, the present invention also anticipates the use of motorized carts or trays carried on conveyors.

Receptacles 11 are positioned on shelves 24 of the mobile element 21. As illustrated in FIG. 2A, the mobile element 21 has four shelves 24 with four receptacles 11 each positioned on a shelf 24. Various means may be used to secure the receptacles 11 on the shelves 24. An intelligent light assembly 10 is positioned on or convenient to each receptacle 11, and each intelligent light assembly 10 is wired 9 in a daisy-chain arrangement, in bi-directional communication, to the put-controller unit 5. Put-controller unit 5, in turn, is in bi-directional, wireless communication 13 with the bi-directional, dual transmitter/receiver element 16 that is in wired, bi-directional communication 8 with the portable computer 4. Each intelligent light assembly 10 includes a visual display means such as an LED or character display and a momentary contact switch 36 or similar device. Momentary contact switch 36 is used to set initial light addresses and to provide the means by which the attendant indicates that the designated put has been completed.

Figure 2B:
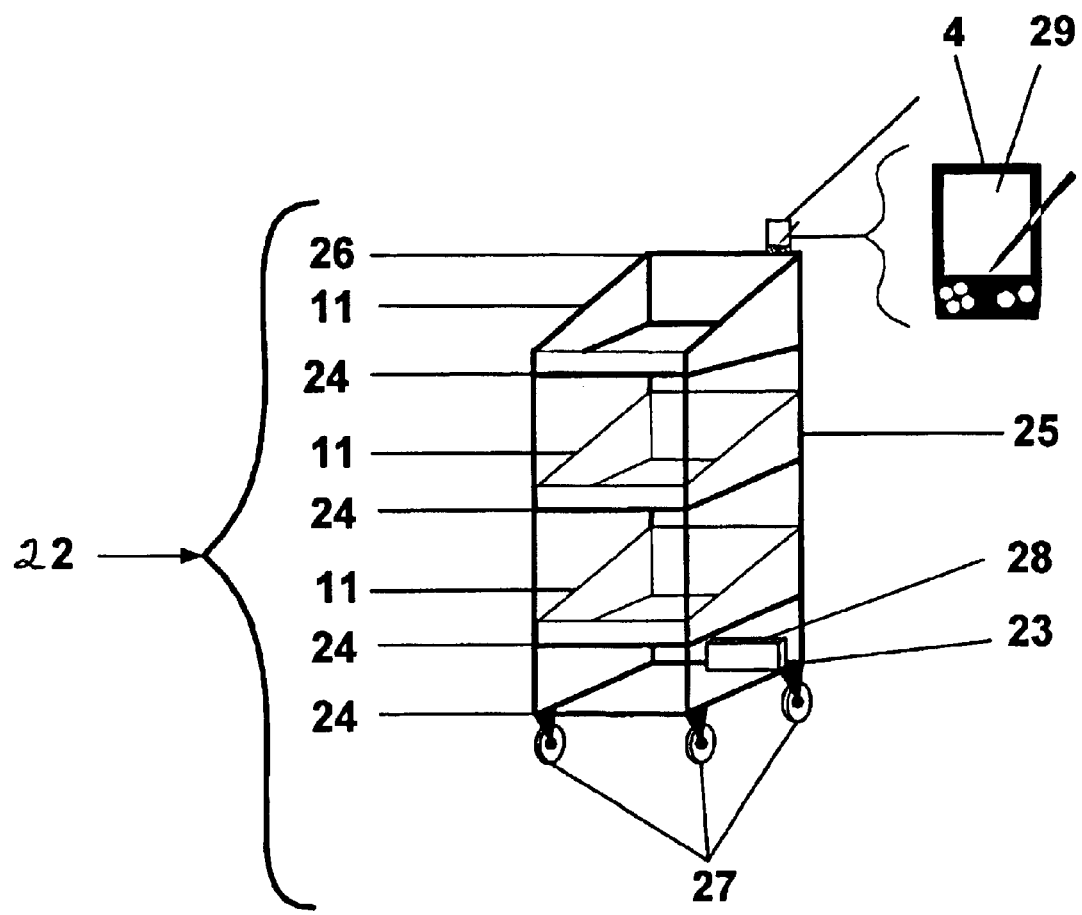
FIG. 2B is an illustration of a mobile unit illustrating the relative positions of the components described in FIG. 2A.

FIG. 2B illustrates an upright cart 22 with a base 23 supporting four casters 27 (only three of which are visible) a vertical frame 25 with a top support 26. As illustrated, the cart 22 has four shelves 24 with three receptacles 11 positioned on these shelves. A power source 28 is positioned on the back side of the cart.

As further illustrated in FIG. 2B, the portable computer 4 is removably positioned on the top support 26. The portable computer 4 is programmed to translate pick order location data to specific intelligent light assembly addresses. The portable computer 4 has visual display means 29, preferably an audio communications means, a keypad, and a touch screen capable of data entry with either a finger or stylus. In addition, the portable computer may receive pick order and other data and instructions by wireless means, by speech input, by diskette transfer, by network linkage, by keypad entry, or comparable means. The portable computer also preferably has audio communication capabilities by means of an integrated microphone and speaker system.

In an alternative configuration, the bi-directional, dual transmitter/receiver element 16 of FIG. 1 may be integral to the portable computer 4. In this configuration, the portable computer 4 may be operated independently of the cart 22.

Figure 3:
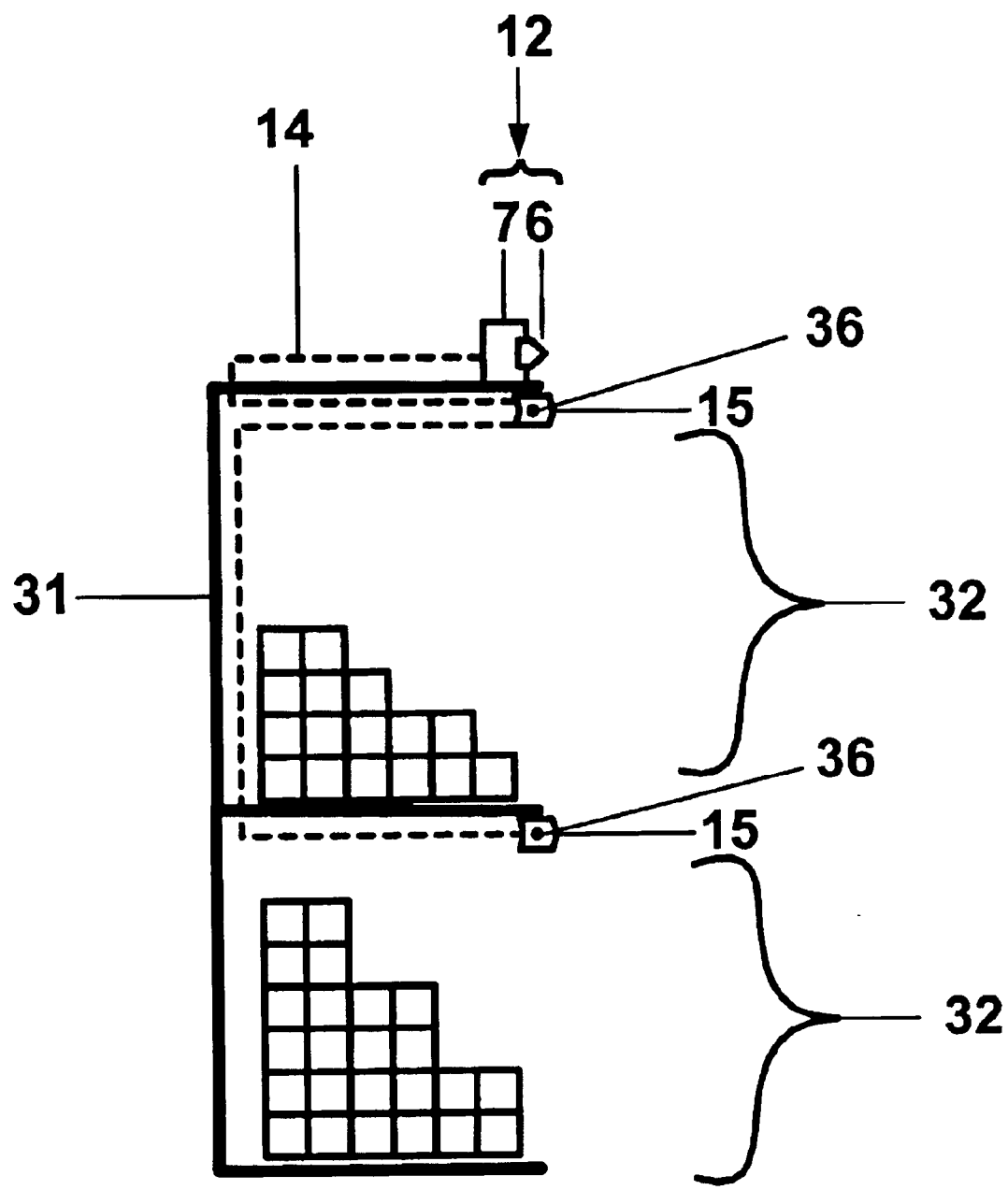
FIG. 3 is a detailed schematic diagram of a stationary unit in accordance with the present invention.

The details of a stationary unit are depicted in FIG. 3. As illustrated in FIG. 3, the pick-controller unit 12 is positioned on a bay 31, comprising a group of storage locations 32. An intelligent light assembly 15 that includes a light display means such as an LED or character display is positioned near each location 32 and wired 14 to the pick-controller unit 12. Each intelligent light assembly 15 includes a momentary contact switch 36, or similar device used to set initial light addresses. As with the mobile unit described above, the momentary contact switch 36 or similar device also provides the means by which the attendant indicates that the designated pick has been completed. Power is provided through a connection to the entire stationary unit by means of either a central source of power or a battery.

The put- and pick-controller units comprise the same basic components and serve the same basic function. Both include a transmitter/receiver component and a controller circuitry element. Communication between both the put- and pick-controller units is by wireless means such as radio frequency means or infrared means. One of average skill in the art will realize that the specific transmitter/receiver component will depend on the wireless means employed.

In addition to the transmitter/receiver component, each put- or pick-controller unit preferably comprises the following:

LED and circuit protection if necessary;

power on/off or reset switch;

power supply; and

RS-485 bi-directional communication port with RJ-45 connector for connecting assemblies together in a daisy-chain configuration.

Each intelligent light assembly preferably comprises the following:

LED indicating status of the intelligent light assembly;

character display (optional);

momentary contact switch;

RS-485 bi-directional communication port;

RJ-45 connectors (2) for connecting assemblies together in a daisy-chain configuration; internal RS-485 terminating resistor, and switches for bypassing or activating the internal circuitry or including or excluding the RS-485 terminating resistor in the circuitry.

The system has the capability of assigning a new light address for any intelligent light assembly positioned at a new location. After installing a new light intelligent assembly on a shelf location, the installer holds down the momentary contact switch on the intelligent light assembly for at least two seconds. This action results in the temporary resetting of the light address to zeros. The put- or pick-controller supervising the collection of intelligent light assemblies polls all known intelligent light assemblies (using a polling list of light addresses augmented with light address "zero") and asks if any messages need to be transmitted. When a newly installed intelligent light assembly (with light address of "zero") is polled, it transmits a "request for light address" message to its attached controller. The attached controller searches for an unassigned light address and assigns this light address to the requesting intelligent light assembly. The newly assigned light address will be transmitted in the address portion of the message header for the intelligent light assembly for subsequent storage in the intelligent light assembly's non-volatile (NV) RAM. The attached controller stores newly assigned light addresses in its poll list and sends a message to the newly installed intelligent light assembly to initiate a slow flashing action with its LED.

Each put- or pick-controller will preferably regulate a maximum of 255 intelligent light assemblies (each corresponding to an intelligent light assembly at a storage site or location). Each time the system is powered-up, it polls all 255 possible intelligent light assemblies, including unassigned light addresses. Thereafter, the attached controller only polls light addresses in the polling list, thereby improving efficiency by bypassing unattached intelligent light assemblies.

In practice, when the system of pick-controllers and intelligent light assemblies is first installed, an operator traverses the entire storage facility without knowing which pick-controllers to poll. The portable computer requests a response from any pick-controller (by polling with a controller address of zero) within its range (generally less than one meter to avoid concurrent communication with multiple controllers). As a pick-controller is contacted, if a new light address has been assigned, the pick-controller so indicates and communicates that new light address to the portable computer. The portable computer in response commands the intelligent light assembly at the new light address to flash its LED rapidly, instructs the attendant to scan the barcode on the shelf location adjacent to the flashing LED with the scanner on the portable computer and to press the momentary contact switch on the intelligent light assembly. This procedure enables the portable computer to associate the shelf location with the newly assigned light address so that attendants can be directed to pick products at that location by illuminating the intelligent light assembly.

EXAMPLE 1

This example of the application of the invention assumes existence of a warehouse management system in which stock keeping units are identified with a specific physical location in a warehouse or storage facility. An order is processed through the warehouse management system to produce a pick order that indicates a specific location and quantity of items to be retrieved from that location.

The portable computer is preprogrammed to translate warehouse locations to pick-controller and light addresses of the desired SKUs and further to allow batch picking of orders by grouping the picking of SKUs from more than one order and then designating specific quantities to be placed in individual receptacles for multiple orders. Generally the light address is limited to a shelf or single location in a designated bay or group of shelves. Thus, the portable computer has further been programmed to, by audio or visual display means, indicate to the operator/attendant the aisle or comparable location for finding the SKU. In addition, the program includes the capability to enter multiple orders for batch putting. The program allows the total number of items to be picked to be indicated at a single pick location and the distribution of the retrieved items to multiple, specific receptacles positioned on the mobile element.

By way of illustration, but not as a limitation, pick orders would be loaded into the portable computer by any common means including a keyboard associated with or remote from the portable computer, as instructions sent by wireless means to the portable computer (which assumes the portable computer is capable of receiving such wireless communications), by network connection, by telephone, by voice, by scanning or card read devices, or from another computer using one of the aforementioned means. Input data include the storage facility location, quantity, SKU number, pick order number, pick order line and customer number or similar basis to sort selected items. A variety of locations may be entered, and the portable computer program will sort picking order lines by location to minimize travel in the facility.

When input data exchange is completed, by audio or visual signal, the portable computer instructs the attendant to travel to a specific location where the first pick is to be made. After each pick is made, the portable computer again instructs the attendant to travel to the next, specific location.

In practice, a storage facility would have a large number of bays, each of which would have an independent, intelligent, pick- controller unit that communicates by wired means with a unique set of up to 255 intelligent light assemblies, each of which intelligent light assemblies is positioned adjacent to a specific storage location. A plurality of mobile elements (carts) each with an independent portable computer and put-controller unit with transmitter/receiver capabilities may be distributed throughout the storage facility and are operated simultaneously. As a means of avoiding unintended actions by multiple, portable computers that may receive messages from the same pick-controller unit, each message transmitted between a portable computer and a pick-controller unit contains a unique, portable computer address. Even though multiple portable computers receive the same message, only the portable computer whose assigned address matches the portable computer address transmitted by a pick-controller unit takes an action based upon the message.

Moreover, the system is designed to confirm successful communication between a given portable computer and a given put- or pick-controller unit. ACK/NAK logic is used with timeouts to confirm success or failure of all communications between the portable computer and any put- or pick-controller unit. As part of fail-soft operation, all transmissions between a portable and a controller unit follow a protocol in which the portable computer transmits appropriate error messages by audio and visual means in the event of a failed transmission.

In a preferred embodiment, an attendant along an aisle following verbal instructions provided by the portable computer through audio means, moves an individual mobile unit containing order location data translated and stored in the portable computer attached to the mobile unit. The portable computer, through a bi-directional, dual transmitter/receiver element, constantly transmits a unique address signal for a specific target pick-controller unit mounted on a bay (polls for the pick-controller unit). Any pick-controller unit within the generally limited range will ignore the poll if the address part of the message does not match the internal address of the pick-controller unit. When the correct, bay-mounted, intelligent, pick-controller unit recognizes its assigned address, a message is sent from the pick-controller unit to the bi-directional, dual transmitter/receiver element connected to the portable computer indicating that the computer has reached the region of the specific, intelligent pick-controller unit. The portable computer then sends a message to the pick-controller unit to flash the LED on an attached, intelligent light assembly at a specific light address. The portable computer then outputs a spoken message directing the attendant to stop and "pick" the item(s) at the location with the flashing LED. If an LED display is part of the assembly, then the quantity to be picked from the location is illuminated in the display; otherwise, the portable computer, by both audio and visual means, instructs the attendant of the quantity of the item to be picked. Upon completion of the pick, the momentary contact switch on the intelligent light assembly is pressed to notify the portable computer of the completed picking. The attendant can report insufficient quantities of any item at a location to the portable computer, thereby reporting an incomplete pick.

In addition to "pick" capabilities, the system characterized in FIG. 1 has "put" (or sort) capabilities to direct the attendant to place various quantities of the picked item from a batch pick order into specific receptacles on the mobile element. The portable computer determines the receptacle locations on the mobile element into which items should be put. Information concerning the locations on the mobile unit for putting is transmitted from the portable computer to a put-controller unit, and from the put-controller unit by wire to the set of intelligent light assemblies on the mobile element that illuminate an LED and (optionally) display the quantity to be placed in each intended receptacle. If a character display is part of the intelligent light assembly, then the quantity to be put into the receptacle is illuminated in the display; otherwise, the portable computer, by either audio or visual means or both, instructs the attendant of the quantity of the item to be put into each receptacle.

The portable computer has means of key, stylus, or touch entry by which the attendant can indicate when the pick/put process has been completed or can otherwise indicate if an item could not be completely filled (short picked). If additional items are to be selected from the same bay, the portable computer activates the next light address; otherwise, it instructs the attendant, by either audio or visual means or both, to move the mobile element (cart) to another area of the storage facility where packing or subsequent processing of the picked items commences.

EXAMPLE 2

The technology and procedures described for warehouse applications find clear application in a variety of other settings. In a second example, the SKU is an item in a large grocery store. Grocery carts are equipped with preprogrammed portable computers, and either an attendant or the customer enters pick instructions and proceeds as described in Example 1.

EXAMPLE 3

The invention finds application in health care delivery in at least two settings. Patient rooms, laboratories, and offices all require certain general supplies and some specialized supplies. The system is readily adapted for use with in-house inventory management. In addition, management of the distribution of patient medications may be improved by application of the system. Pick orders may be handled in the usual manner as previously described, but the actual put order (delivery to the patient) can be verified by a simple RFID chip integrated with the patient's hospital identification and records.

EXAMPLE 4

The system finds practical application when operated in reverse. Distribution of multiple SKUs to different customers can be accomplished by illuminating intelligent light assemblies adjacent to receptacles on a cart, where each receptacle contains multiple instances of a single SKU to be picked, and similarly by illuminating intelligent light assemblies adjacent to shelves on a storage bay onto which the items should be put. The illuminated intelligent light assembly on the cart receptacle would indicate the quantity of items to be picked while the illuminated intelligent light assembly (or assemblies) on the bay would indicate the quantity of the item to be put onto each shelf location.

Preferred embodiments of the invention have been described using specific terms and devices. The words and terms used are for illustrative purposes only. The words and terms are words and terms of description, rather than of limitation. It is to be understood that changes and variations may be made by those of ordinary skill art without departing from the spirit or scope of the invention, which is set forth in the following claims. In addition it should be understood that aspects of the various embodiments may be interchanged in whole or in part. Therefore, the spirit and scope of the appended claims should not be limited to descriptions, figures, and examples herein.

What is claimed is:

1. A distributed intelligence, wireless, light-directed pick/put system comprising:
   a. at least two mobile units comprising, each of said at least two mobile units comprising:
      i. a portable computer comprising data input means, data and instruction presentation means, and programmed capability to associate input facility location data with unique light addresses and with specific put locations;
      ii. a put-controller unit comprising a bi-directional, transmitter/receiver component and an intelligent circuit element capable of controlling intelligent light assemblies, said put-controller unit having a unique controller address and being in bi-directional communication with said portable computer through a bi-directional, dual transmitter/receiver element;
      iii. a mobile element capable of being propelled through a storage facility, wherein said put-controller unit is positioned on said mobile element, and said portable computer is positioned on said mobile element, and said bi-directional, dual transmitter/receiver element is positioned on said mobile element, and further comprising a power source for said portable computer and said put-controller unit;
      iv. one or more storage receptacles positioned on said mobile element wherein each of said one or more receptacles has associated with it an intelligent light assembly comprising an intelligent circuit component, a visual display means, and a momentary contact switch means, and further wherein each of said intelligent light assemblies is positioned adjacent to a specific receptacle; and
      v. said bi-directional, dual transmitter/receiver element comprising a wired communication means for connecting to said portable computer and communication means for connecting to said put-controller unit and to a pick-controller unit; and
   b. at least one stationary unit comprising: said pick-controller unit comprising a transmitter/receiver component and an intelligent circuitry element wherein said pick-controller unit has a unique controller address and is in wireless, bi-directional communication with said bi-directional, dual transmitter/receiver element, and further wherein said pick-controller element is in electrical communication with a plurality of intelligent light assemblies each of which intelligent light assemblies comprises an intelligent circuit component, a visual display means, and a momentary contact switch means, and further wherein each of said intelligent light assemblies is positioned adjacent to a specific, physical storage location in a bay of storage locations, such that each of said intelligent light assemblies contains a specific light address associated with the physical location at which it is positioned.

2. The distributed intelligence, wireless, light-directed pick/put system of claim 1 wherein said data and instruction presentation means comprise visual display means.

3. The distributed intelligence, wireless, light-directed pick/put system of claim 1 wherein said data and instruction presentation means comprise enunciation means.

4. The distributed intelligence, wireless, light-directed pick/put system of claim 1 wherein said data and instruction presentation means comprise visual and enunciation means.

5. The distributed intelligence, wireless, light-directed pick/put system of claim 1 wherein said portable computer receives data and information via wireless communication from a second computer.

6. The distributed intelligence, wireless, light-directed pick/put system of claim 1 wherein said portable computer receives data and information via keypad entry.

7. The distributed intelligence, wireless, light-directed pick/put system of claim 1 wherein said portable computer receives data and information via wired communication from a second computer.

8. The distributed intelligence, wireless, light-directed pick/put system of claim 1 wherein said portable computer and said bi-directional, dual transmitter/receiver element are removably positioned on said mobile element and further wherein said bi-directional, dual transmitter/receiver element is integral to said portable computer.

9. A method of retrieving items from indicated storage locations and of placing said retrieved items into designated receptacles comprising the steps of:
   a. providing mobile elements;
   b. associating a specific, portable computer with each of said mobile elements;
   c. programming said specific, portable computer to translate pick order item locations to specific pick light addresses and to specific put light addresses;
   d. entering pick orders into said at least one portable computer;
   e. activating a communication system that allows identification of the location and quantities of stored items to be retrieved;
   f. instructing each operator of each of said mobile elements to travel to a specific bay of storage locations in response to instructions communicated by said portable computer;
   g. identifying both location from which specified, stored items are to be retrieved and the quantity of each of said stored items to be retrieved as indicated by intelligent light assemblies positioned at storage locations;
   h. retrieving said designated quantity of an item from the indicated location and placing indicated quantities of said item into specific receptacles on said mobile element as indicated by intelligent light assemblies associated with each of said receptacles;

i. operating a momentary contact switch to indicate that the pick has been completed;

j. repeating the steps of retrieving designated quantities of items from indicated locations and placing indicated quantities of said retrieved, designated items into designated receptacles until at least one order is filled; and k. unloading said receptacles at a designated station and returning said mobile element to repeat the entire pick/put process for a new set of orders.

10. The method of claim 9 wherein the step of retrieving the desired quantity of an item further comprises the steps of reporting to the portable computer any insufficiency of items in the indicated location and thereby reporting an incomplete pick.

11. A distributed intelligence communication system comprising:

a. means for enabling a pick-controller unit to engage in two-way communication with a computer by means of a bi-directional, dual transmitter/receiver element and for enabling said pick-controller unit to engage in two-way communication with a plurality of first intelligent light assemblies;

b. means for enabling at least one put-controller unit to engage in two-way communication with a computer by means of a bi-directional, dual transmitter/receiver element and for enabling said at least one put-controller unit to engage in two-way communication with a plurality of second intelligent light assemblies;

c. means for enabling a first intelligent light assembly to respond to a coded message transmitted from said computer, through said pick-controller unit thereby activating a specific light and further activating a display of unique instructions and related information to an operator; and d. means for enabling a second intelligent light assembly to be activated in coordination with the activation of said first intelligent light assembly in a prescribed, coordinated manner.

12. The distributed intelligence communication system of claim 11 further comprising programmed means for allowing an operator to assign a unique light address to each of said plurality of first intelligent light assemblies and to each of said plurality of second intelligent light assemblies, and further comprising programmed means for enabling an operator to indicate that a designated task has been completed.

13. The distributed intelligence communication system of claim 11 wherein said means for enabling said pick-controller unit comprises circuitry capable of being programmed to recognize and respond to coded information and further to transmit programmed instructions to said first plurality of intelligent light assemblies.

14. The distributed intelligence communication system of claim 11 wherein said means for enabling said at least one put-controller unit comprises circuitry capable of being programmed to recognize and respond to coded information and further to transmit programmed instructions to said plurality of second intelligent light assemblies.

15. The distributed intelligence communication system of claim 11 comprises programmed means for enabling an operator to assign unique light addresses to each of said plurality of first intelligent light assemblies.

16. The distributed intelligence communication system of claim 11 wherein said pick-controller units and each of said at least one put-controller units and each of said plurality of first intelligent light assemblies and each of said plurality of second intelligent light assemblies is capable of being programmed individually to receive coded instructions to which each responds.

17. The distributed intelligence communication system of claim 11 comprises programmed means for enabling an operator to assign unique light addresses to each of said plurality of first intelligent light assemblies and to each of said plurality of second intelligent light assemblies, and further wherein said pick-controller units and said at least one put-controller units and each of said plurality of first intelligent light assemblies and each of said plurality of second intelligent light assemblies is capable of being individually programmed to receive coded instructions to which each responds.

\* \* \* \* \*